United States Patent
van Ek

(10) Patent No.: US 8,940,418 B1
(45) Date of Patent: Jan. 27, 2015

(54) DYNAMIC SPRING MEDIA WITH MULTIPLE EXCHANGE COUPLED HARD-SOFT MAGNETIC LAYERS

(75) Inventor: Johannes van Ek, Niwot, CO (US)

(73) Assignee: WD Media, LLC, San Jose, CA (US)

( * ) Notice: Subject to any disclaimer, the term of this patent is extended or adjusted under 35 U.S.C. 154(b) by 160 days.

(21) Appl. No.: 12/978,225

(22) Filed: Dec. 23, 2010

(51) Int. Cl.
*G11B 5/667* (2006.01)

(52) U.S. Cl.
CPC ...................................... *G11B 5/667* (2013.01)
USPC ........................................ 428/828.1; 428/829

(58) Field of Classification Search
None
See application file for complete search history.

(56) References Cited

U.S. PATENT DOCUMENTS

| | | |
|---|---|---|
| 5,603,766 A | 2/1997 | Visokay et al. |
| 5,824,409 A | 10/1998 | Sellmyer et al. |
| 6,007,623 A | 12/1999 | Thiele et al. |
| 6,086,974 A | 7/2000 | Thiele et al. |
| 6,139,907 A | 10/2000 | Sellmyer et al. |
| 6,183,606 B1 | 2/2001 | Kuo et al. |
| 6,468,670 B1 | 10/2002 | Ikeda et al. |
| 6,599,646 B2 | 7/2003 | Suzuki et al. |
| 6,716,516 B2 | 4/2004 | Futamoto et al. |
| 6,824,817 B2 | 11/2004 | Araki et al. |
| 6,830,824 B2 | 12/2004 | Kikitsu et al. |
| 6,834,026 B2 | 12/2004 | Fullerton et al. |
| 6,846,583 B2 | 1/2005 | Inaba et al. |
| 6,881,495 B2 | 4/2005 | Kikitsu et al. |
| 6,881,496 B2 | 4/2005 | Okamoto |
| 6,881,497 B2 | 4/2005 | Coffey et al. |
| 7,081,309 B2 | 7/2006 | Do et al. |
| 7,195,827 B2 | 3/2007 | Maeda et al. |
| 7,241,520 B2 | 7/2007 | Shin et al. |
| 7,282,278 B1 | 10/2007 | Nolan |
| 7,286,324 B2 | 10/2007 | Yasui et al. |
| 7,384,699 B2 | 6/2008 | Nolan et al. |
| 7,425,377 B2 | 9/2008 | Fullerton et al. |
| 7,435,489 B2 | 10/2008 | Umeda et al. |
| 7,488,545 B2 * | 2/2009 | Fullerton et al. ............ 428/828.1 |
| 7,550,210 B2 | 6/2009 | Berger et al. |
| 7,556,870 B2 | 7/2009 | Do et al. |
| 7,572,526 B2 * | 8/2009 | Berger et al. .............. 428/828.1 |
| 7,582,368 B2 | 9/2009 | Berger et al. |
| 7,625,643 B2 | 12/2009 | Umeda et al. |
| 7,638,210 B2 | 12/2009 | Berger et al. |
| 7,736,769 B2 | 6/2010 | Ajan |
| 8,173,282 B1 | 5/2012 | Sun et al. |
| 2002/0041980 A1 | 4/2002 | Suzuki et al. |
| 2003/0108721 A1 | 6/2003 | Fullerton et al. |

(Continued)

FOREIGN PATENT DOCUMENTS

| | | |
|---|---|---|
| WO | 2008030199 A1 | 3/2008 |
| WO | 2010038448 | 4/2010 |

OTHER PUBLICATIONS

Wang, Jian-Ping et al., "Exchange Coupled Composite Media for Perpendicular Magnetic Recording", IEEE Transactions on Magnetics, vol. 41, No. 10, pp. 3181-3186, Oct. 2005.

(Continued)

*Primary Examiner* — Kevin Bernatz

(57) ABSTRACT

A perpendicular magnetic recording (PMR) media structure with multiple exchange couple composite (ECC) layer structure is described. The PMR disk structure may include multiple soft magnetic layers with intervening hard magnetic layers and in between. The interface between the soft magnetic layers and the hard magnetic layers may be separated by exchange coupled layers.

18 Claims, 6 Drawing Sheets

(56) References Cited

U.S. PATENT DOCUMENTS

| | | |
|---|---|---|
| 2003/0162041 A1 | 8/2003 | Nemoto et al. |
| 2004/0110035 A1 | 6/2004 | Shin et al. |
| 2004/0185307 A1 | 9/2004 | Oikawa et al. |
| 2004/0191578 A1 | 9/2004 | Chen et al. |
| 2005/0106422 A1 | 5/2005 | Lu et al. |
| 2006/0166039 A1* | 7/2006 | Berger et al. ............. 428/828.1 |
| 2006/0177704 A1 | 8/2006 | Berger et al. |
| 2006/0188743 A1 | 8/2006 | Seki et al. |
| 2007/0009654 A1 | 1/2007 | Watanabe et al. |
| 2007/0026262 A1 | 2/2007 | Maeda |
| 2007/0072011 A1* | 3/2007 | Li et al. ..................... 428/828.1 |
| 2007/0231609 A1 | 10/2007 | Ajan et al. |
| 2007/0243418 A1 | 10/2007 | Fullerton et al. |
| 2007/0292720 A1* | 12/2007 | Suess ........................ 428/828.1 |
| 2008/0180843 A1 | 7/2008 | Zhang et al. |
| 2008/0198512 A1 | 8/2008 | Mukai |
| 2008/0292907 A1* | 11/2008 | Berger et al. ................. 428/828 |
| 2008/0299416 A1 | 12/2008 | Yoon et al. |
| 2008/0311430 A1 | 12/2008 | Chen et al. |
| 2009/0135527 A1 | 5/2009 | Lee et al. |
| 2009/0257147 A1 | 10/2009 | Ajan |
| 2009/0290256 A1* | 11/2009 | Berger et al. ............ 360/125.02 |
| 2010/0062286 A1 | 3/2010 | Suess |
| 2010/0128391 A1 | 5/2010 | Berger et al. |
| 2010/0209737 A1 | 8/2010 | Bian et al. |
| 2010/0247960 A1* | 9/2010 | Qiu et al. ....................... 428/800 |
| 2011/0003175 A1* | 1/2011 | Valcu et al. ................... 428/800 |
| 2011/0122525 A1* | 5/2011 | Nemoto et al. ................. 360/75 |
| 2012/0026626 A1* | 2/2012 | Nolan et al. ................... 360/135 |

OTHER PUBLICATIONS

Hu, Jiang Feng et al., "Exchange Coupling Assisted FePtC Perpendicular Recording Media", Applied Physics Letters 93, 072504 pp. 1-3, Aug. 2008.

Chen, Jing Sheng et al., "High Coercivity L10 FePt Films with Perpendicular Anisotropy Deposited on Glass Substrate at Reduced Temperature", Applied Physics Letters 90, 042508 pp. 1-3, Jan. 2007.

H. Nakagawa, et al., "Effects of Thin Carbon Intermediate Layer on Magnetic and Structural Properties of Perpendicular Recording Media", Journal of Magnetism and Magnetic Materials, 235, pp. 73-77, 2001.

Zhu, Jimmy, "Understand PMR Media", Data Storage Systems Center, Carnegie Mellon University, 2009, 16 pages.

English machine translation of JP08-30951, Japan, Feb. 1996. (8 pages).

* cited by examiner

DYNAMIC SPRING MEDIA WITH MULTIPLE EXCHANGE COUPLED HARD-SOFT MAGNETIC LAYERS

TECHNICAL FIELD

This invention relates to the field of disk drives and more specifically, to perpendicular magnetic recording media for disk drives.

BACKGROUND

In perpendicular magnetic recording (PMR) media, increases in areal density have been accomplished by scaling down the area of a data bit by reducing the grain size of the magnetic particles in the recording medium. In order to maintain thermal stability in the smaller grains, media with higher magnetic anisotropy is used. A higher magnetic anisotropy makes the magnetization more resistant to thermal fluctuations. However, a higher magnetic anisotropy also means that a stronger writing field is required to write a data bit. Due to the limit of the writing field a recording head can induce, media with high magnetic anisotropy may exceed a coercivity threshold of the writing field and may not be recordable by conventional recording heads.

One way to decrease the writing field of high anisotropy media is to use an exchange spring media, also known as exchange coupled composite (ECC) media. FIG. 1 illustrates a single ECC layer media structure 100 in which a composite recording layer employs a magnetic soft layer 103 to exchange couple a magnetic hard layer 101 below. In such single ECC layer media structure 100, the magnetic soft layer 103 will switch in presence of an external field and apply a magnetic torque to assist in the switching of the magnetic hard layer 101 below, and thereby decreases the writing field required to switch the magnetization of the highly anisotropic media. To provide better control of the exchange coupling, an exchange coupling layer 102 is disposed between the magnetic hard layer 101 and the magnetic soft layer 103. By changing the thickness of the exchange coupling layer 102, the degree of exchange coupling can be adjusted. The exchange coupling layer 102 also enables epitaxial transfer of texture from the hard magnetic recording layer 101 to the soft magnetic recording layer 103. U.S. Pat. No. 7,572,526 describes a single ECC layer media structure with a hard magnetic recording layer at the bottom and a multilayer soft layer on top. While such a structure can reduce the writing field required for highly anisotropic media, the reduction is limited because the assisting magnetic torque is only applied from the top side of the magnetic hard layer.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent, however, to one skilled in the art that these specific details need not be employed to practice various embodiments of the present invention. In other instances, well known components or methods have not been described in detail to avoid unnecessarily obscuring various embodiments of the present invention.

The terms "above," "under," and "between" as used herein refer to a relative position of one media layer with respect to other layers. As such, for example, one layer disposed above or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Additionally, the relative position of one layer with respect to other layers is provided assuming operations are performed relative to a substrate without consideration of the absolute orientation of the substrate.

Embodiments of the present invention include a perpendicular magnetic recording (PMR) media structure with soft magnetic layers on both the top and bottom sides of multiple hard magnetic layers to provide magnetic torque on both sides of the hard magnetic layers to decrease the writing field required to switch the magnetization of highly anisotropic media. Between the soft and hard magnetic layers, exchange coupling layers provide a controllable and tunable exchange coupling between the soft and hard magnetic layers while also enabling epitaxial transfer of texture from one layer to another. The degree of exchange coupling may be controlled by adjusting the thickness of the exchange coupling layers between the soft and hard magnetic layers while still maintaining a desired texture.

Figure 1:
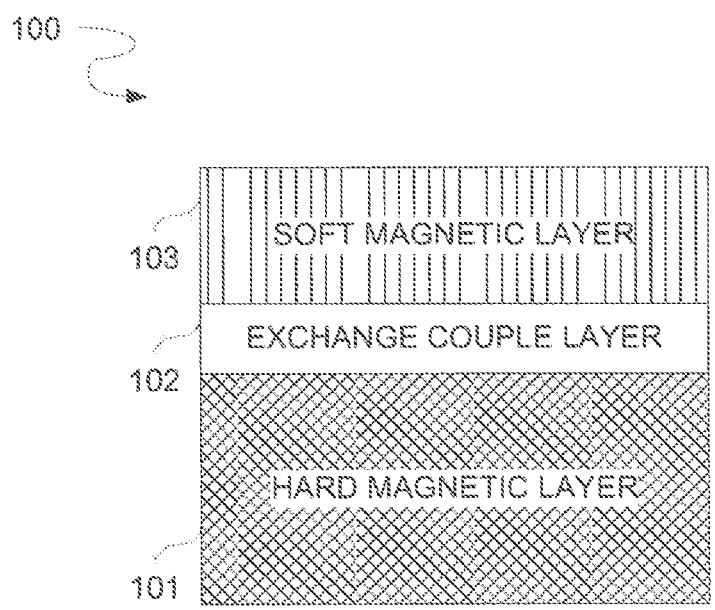
FIG. 1 illustrates a conventional single exchange coupled composite (ECC) layer structure of a perpendicular magnetic recording (PMR) media.
Figure 2:
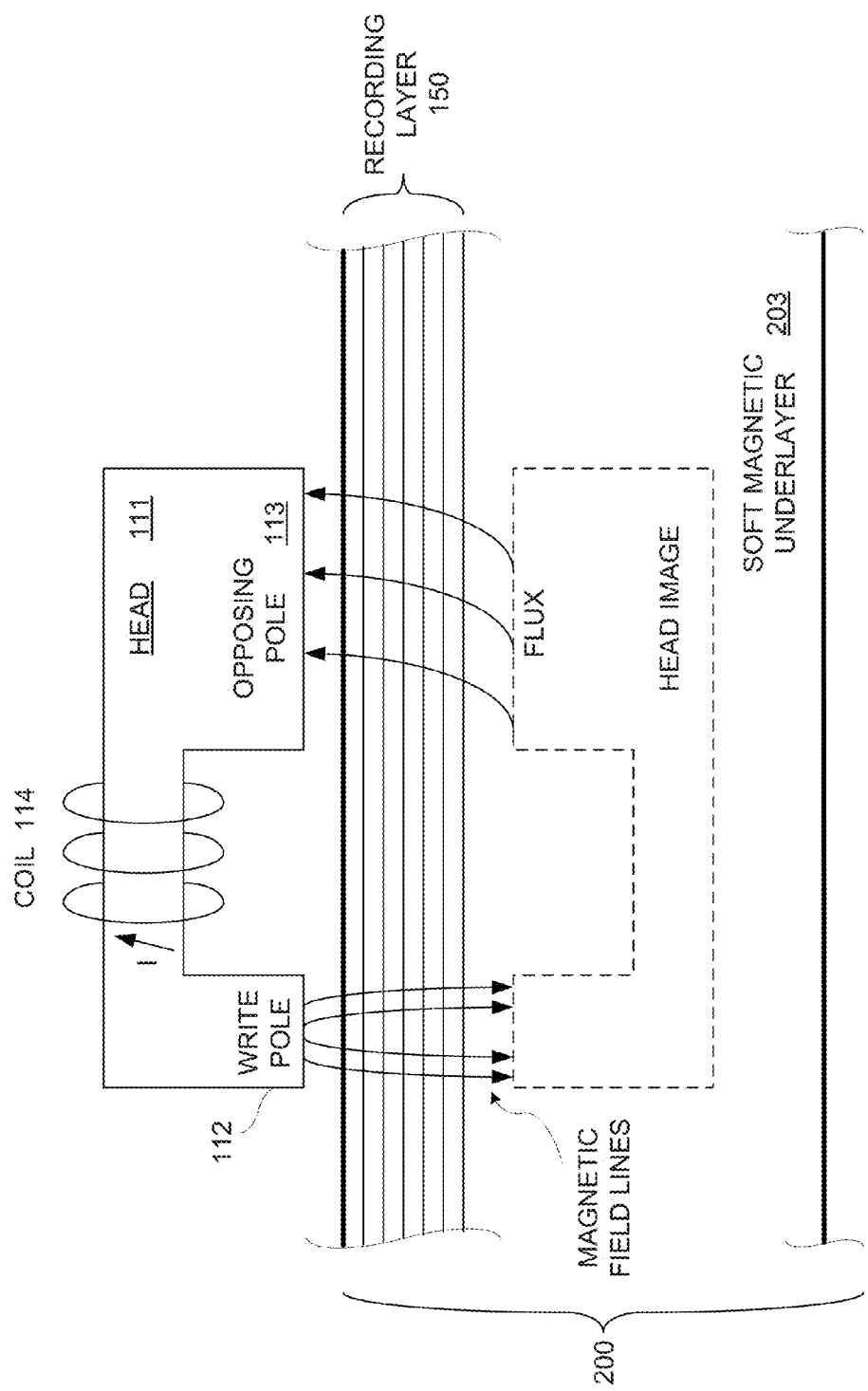
FIG. 2 illustrates a PMR disk drive system including a PMR disk with a multiple ECC structure in accordance with an embodiment of the present invention.

FIG. 2 illustrates portions of a PMR disk drive system having a recording head 111 including a trailing write pole 112 and a leading return (opposing) pole 113 magnetically coupled to the write pole 112. An electrically conductive magnetizing coil 114 surrounds the yoke of the write pole 112. The bottom of the opposing pole 113 has a surface area greatly exceeding the surface area of the tip of the write pole 112. As the PMR disk 200 is rotated past the recording head 111, current is passed through the coil 114 to create magnetic flux within the write pole 112. The magnetic flux passes from the write pole 112, through the disk 115, and across to the opposing pole 113 to record in the recording layer 150. In the exemplary embodiment, the recording layer 150 has a multiple exchange coupled composite (ECC) structure. The SUL 203 enables the magnetic flux from the trailing write pole 112 to return to the leading opposing pole 113 with low impedance.

Figure 3:
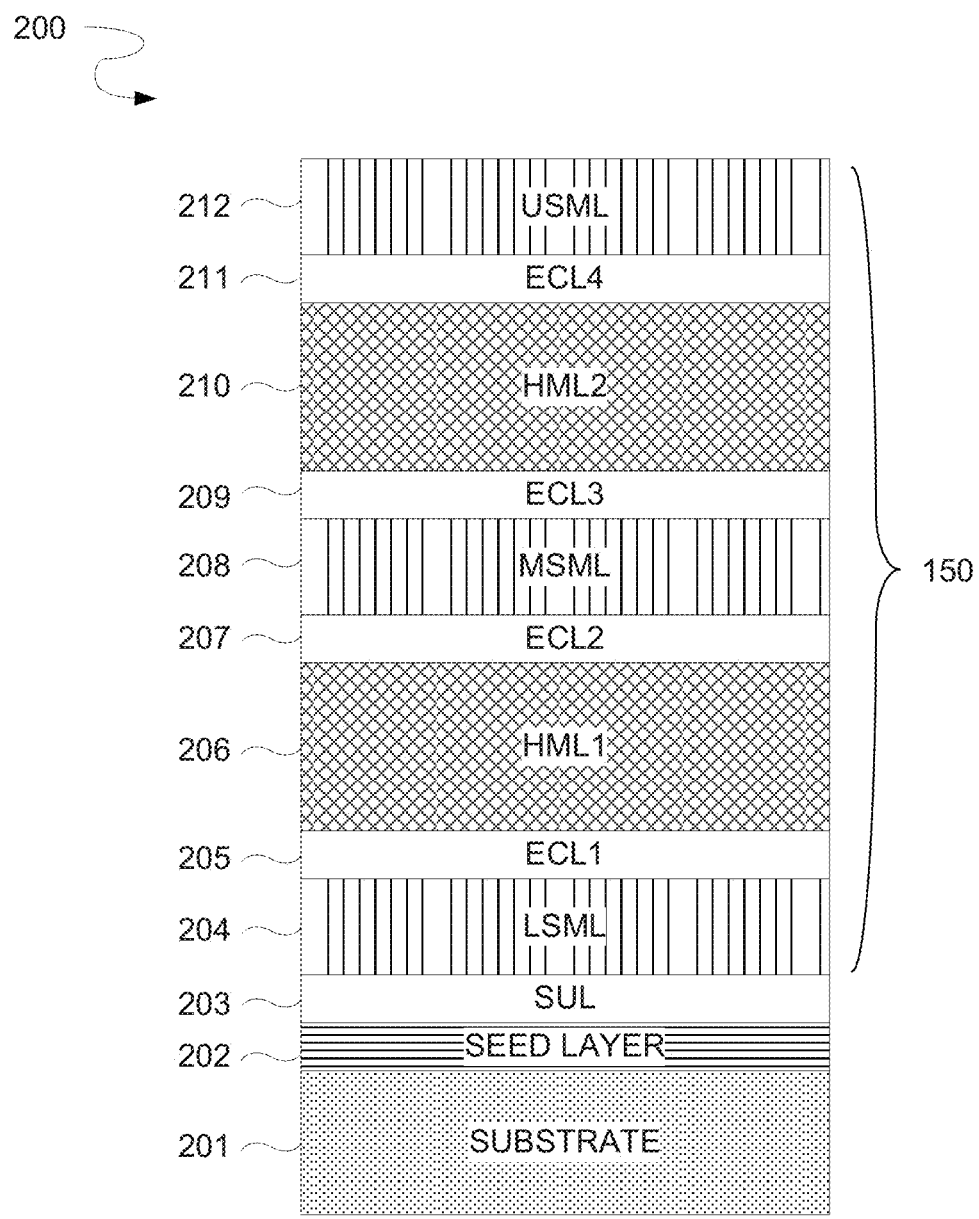
FIG. 3 illustrates a multiple ECC structure of a PMR media in accordance with an embodiment of the present invention.

FIG. 3 illustrates a cross-sectional depiction of an exemplary embodiment of a PMR disk 200 with a recording layer 150 that has a multiple ECC structure. It should be appreciated that the layers discussed herein may be formed on both sides of substrate to form a double-sided magnetic recording disk. However, only the layers on a single side of substrate are shown for ease of illustration. Alternatively, a single sided perpendicular magnetic recording disk may also be formed.

As depicted in FIG. 3, the PMR disk 200 includes a substrate 201. Substrate 201 may be, for example, a glass, a metal, and/or a metal alloy material. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used. Substrate 201 may also be plated with a nickel phosphorous (NiP) layer (not shown). The substrate surface (or the plated NiP surface) may be polished and/or textured.

Disposed over the substrate 201 is a soft magnetic underlayer (SUL) 203. A seed layer 202 made of aluminum titanium (AlTi) or similar alloy may be disposed between the substrate 201 and the SUL 203. Generally, the SUL 203 may include any materials known in the art. The SUL 203 itself may be laminated or multilayered of a plurality of soft magnetic layers separated by nonmagnetic or antiferromagnetic films. In one exemplary embodiment, the SUL 203 includes a synthetic antiferromagnet (SAF) structure composing of two amorphous soft ferromagnetic layers (e.g., CoTaZr or CoFeTaZr, etc.) antiferromagnetically coupled with one another across a spacer layer (e.g. ruthenium (Ru)) there-between.

Above the SUL 203, the PMR disk 200 further includes at least three soft magnetic layers 204, 208, and 212 with intervening hard magnetic layers 206 and 210 in between. Disposed between each of the soft magnetic layers 204, 208, and 212 and the hard magnetic layers 206 and 210 are exchange coupled layers 205, 207, and 209. The saturation magnetization of each of the soft magnetic layers and hard magnetic layers is between 500 emu/cc and 700 emu/cc. In an exemplary embodiment, the saturation magnetization in each of the soft and hard magnetic layers is 600 emu/cc. In other embodiments, the soft and hard magnetic layers may have other saturation magnetization values.

The hard magnetic layers 206 and 210 may be composed of a ferromagnetic FePtX alloy such as FePtC and may have a thickness between 6 nm and 12 nm. In an exemplary embodiment, the thickness of the hard magnetic layers 206 and 210 may be 10 nm. Other constituents that may be used instead of carbon in the FePtX alloy include, for example, Cr, Zr, Cu, Ta, Co, and B. Alternatively, yet other materials may be used for the hard magnetic layers such as CoCrPtx. The soft magnetic layers 204, 208, and 212 may also be composed of a FePtX alloy and may have a thickness, for example, between 3 nm and 6 nm. In other embodiments, the soft and hard magnetic layers may have other thicknesses.

The soft magnetic layers 204, 208, and 212 each have a perpendicular (out-of-plane) anisotropy field $H_k$ less than 10 kOe. In contrast, the hard magnetic layers 206 and 210 each have an anisotropy of greater than 10 kOe. Even though the same type of FePtX alloy may be used for both the soft and hard magnetic layers, the anisotropy of each layer can be independently increased or decreased by increasing or decreasing, respectively, the concentration of Pt in each layer.

For example, the soft magnetic layers 204, 208, and 212 may be composed of a FePtX alloy with a concentration of Pt such that the anisotropy is between 4 kOe and 10 kOe, while the hard magnetic layers 206 and 210 may be composed of a FePtX alloy with a concentration of Pt such that the anisotropy is between 12 kOe and 20 kOe. In an exemplary embodiment, the anisotropy of the soft magnetic layers 204, 208, and 212 may be 8 kOe, while the anisotropy of the hard magnetic layers 206 and 210 may be 18 kOe. In other embodiments, the soft and hard magnetic layers may have other Pt concentrations and other anisotropy values.

The low anisotropy of the soft magnetic layers 204, 208, and 212 allows the magnetic orientation of these layers to change in direct response to an applied writing field. This change in magnetic orientation of the soft magnetic layers 204, 208, and 212 then applies a magnetic torque on the hard magnetic layers 206 and 210. By sandwiching the hard magnetic layers 206 and 210 in between soft magnetic layers 204, 208, and 212, the assisting magnetic torque is applied from both the top and bottom sides of the hard magnetic layers 206 and 210. This dual magnetic torque provides a greater reduction in the writing field necessary to overcome the higher anisotropy of magnetically harder layers 206 and 210 than if the magnetic torque is only applied from the top side. With this further reduction in the writing field, smaller grain size and higher anisotropy materials can be used without sacrificing recordability with conventional recording heads. This results in not only higher density media, but also better signal-to-noise (SNR) ratio for the media because with the smaller grain size, the ratio of grains per data bit can be increased while maintaining the same bit storage capacity.

The dual magnetic torque applied to the hard magnetic layers 206 and 210 from both top and bottom sides may also improve the switching speed of the media and result in a higher recording data rate. In certain embodiments, to further improve the switching speed, the anisotropy of the upper soft magnetic layer (USML) 212 may be greater than the anisotropy of the middle soft magnetic layer (MSML) 208, which in turn may be greater than anisotropy of the lower soft magnetic layer (LSML) 204. The intensity of the applied magnetic field decreases as a function of distance away from the recording head. Hence, the LSML 204 and MSML 208 may experience smaller writing field intensities than the USML 212 and may take slightly longer to change magnetic orientation. To reduce this switching delay in the LSML 204 and MSML 208 and to synchronize the switching time of the three soft magnetic layers 204, 208 and 212, the anisotropy of the LSML 204 and MSML 208 can be scaled accordingly. This in turn synchronizes the top and bottom magnetic torques applied to the hard magnetic layers 206 and 210 to yield faster switching speed.

Disposed between the soft magnetic layers and hard magnetic layers are exchange coupled layers 205, 207, and 209. These exchange coupled layers 205, 207, and 209 facilitate epitaxial growth for the adjacent magnetic layers and allow the degree of interlayer coupling between the soft and hard magnetic layers to be controlled. The degree of inter-layer coupling can be controlled by adjusting the thickness of the exchange coupled layers 205, 207, and 209. For example, in an exemplary embodiment, the exchange coupled layers may have a thickness such that the lateral exchange coupling in each of the soft magnetic layers is approximately 0.2 µerg/cm and the lateral exchange coupling in each of the hard magnetic layers is 0.1 uerg/cm, while the coupling across each of the exchange coupling layers is on the order of 1 erg/cm². In other embodiments, the various layers may have other lateral exchange coupling energies.

The exchange coupled layers 205, 207, and 209 may include one or more of Pt, Pd, Ag, X, or MgO with the layer thickness being less than approximately 2 nm. In other embodiments, the exchange coupled layers 205, 207, and 209 includes both Pt and an oxide material such as one of more of $SiO_2$, $TiO_2$, $Cr_2O_3$, $WO_3$, and Ta oxide. In yet other embodiments, the exchange coupled layers 205, 207, and 209 may compose of other materials and may have other thicknesses.

Figure 4:
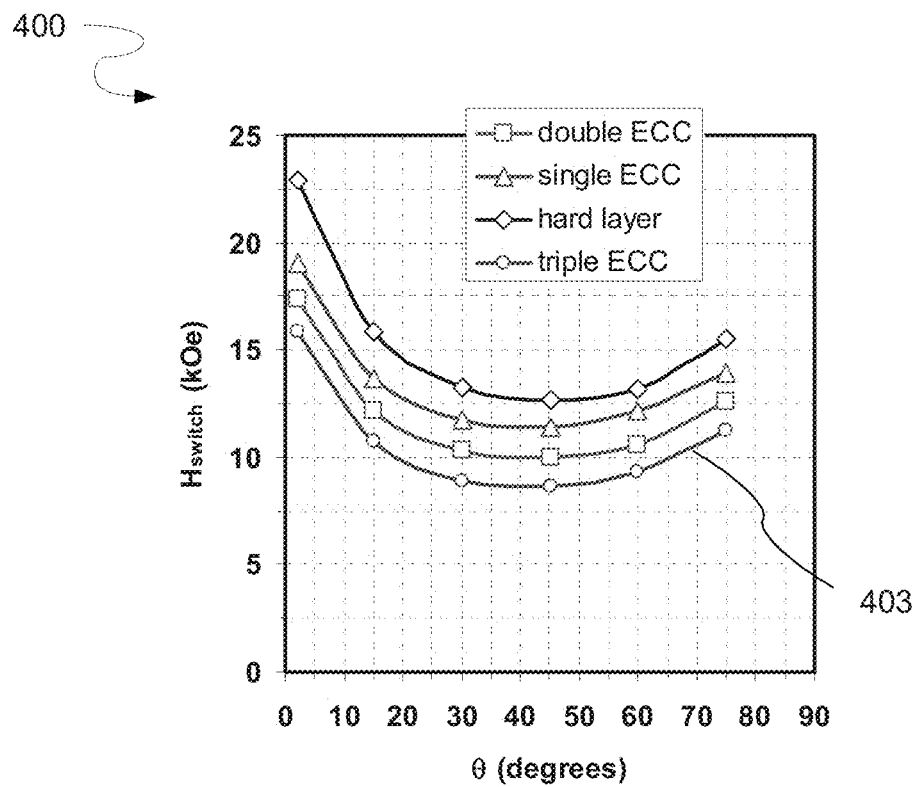
FIG. 4 illustrates the switching fields of different PMR media structures including a multiple ECC structure in accordance with an embodiment of the present invention.

FIG. 4 is a graph 400 illustrating the switching field of different PMR media structures as a function of applied field angle for a 12 nm thick hard magnetic layer in accordance with one embodiment of the present invention. In this embodiment, the saturation magnetization for both the hard and soft layers is 600 emu/cc. The anisotropy of the hard magnetic layer is 18 kOe and that of the soft magnetic layers is 8 kOe. The lateral exchange coupling in the soft magnetic layers is 0.2 μerg/cm and the lateral exchange coupling in the hard magnetic layers is 0.1 μerg/cm, while the coupling across the exchange coupling layers is on the order of 1 erg/cm$^2$.

As depicted in FIG. 4, the lowest switching field necessary to write a conventional PMR media structure with only a hard magnetic layer is about 12.6 kOe at an angle of 45 degrees. A single ECC layer structure reduces this to about 11.5 kOe, and a double ECC structure future reduces this to about 10 kOe. The addition of a second ECC layer at the bottom of the media stack results in a 1.4 to 1.6 kOe drop in switching field. A switching field of below 10 kOe can be achieved by including multiple (e.g., triple) ECC layers in a PMR media structure as shown by the bottom curve 403 in FIG. 4.

Figure 5:
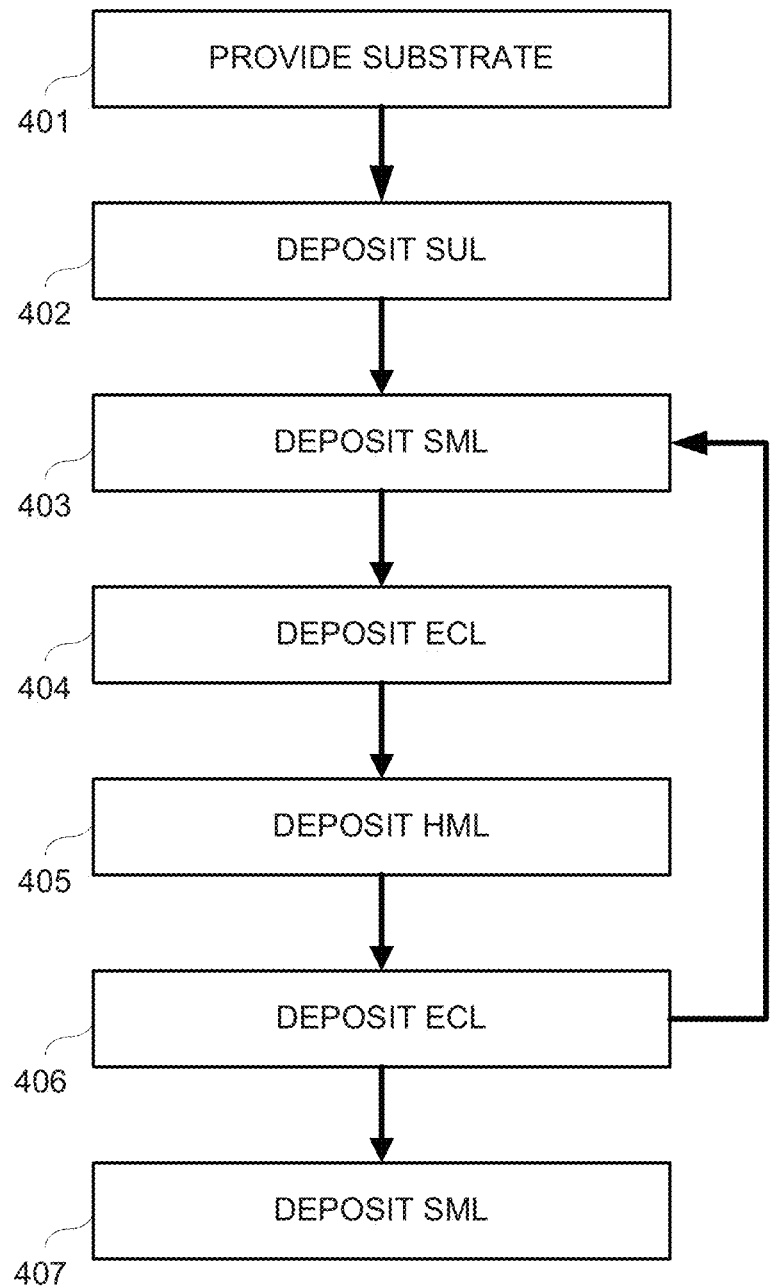
FIG. 5 illustrates one embodiment of a method of manufacturing a magnetic recording disk with a multiple ECC structure in accordance with an embodiment of the present invention.

FIG. 5 illustrates one embodiment of a method of manufacturing a PMR disk 200 having a recording layer 150 with a multiple ECC structure as that described elsewhere herein in reference to FIG. 3. A substrate 201 is provided at operation 401. At operation 402, the SUL 203 including any of the materials described elsewhere herein is deposited over substrate 201. At operation 403, a lower soft magnetic layer (LSML) 204 is deposited over the SUL 203. The deposition of the various layers including the SUL 203 and the LSML 204 may be accomplished by a variety of methods well known in the art, for example, sputtering, chemical vapor deposition, or ion-beam deposition; accordingly a detailed discussion is not provided.

At operation 404, a first exchange couple layer (ECL1) 205 is deposited over LSML 204 such that the ECL1 205 epitaxially grows with the texture of the LSML 204 below. In an exemplary embodiment, the ECL1 205 is sputter deposited on the LSML 204 below. While the sputter target composition may vary, exemplary embodiments include a substantially pure Pt target or a Pt-oxide target containing any of the oxide materials described for the ECL1 205.

At operation 405, a first hard magnetic layer (HML1) 206 is deposited over ECL1 205. In one embodiment, the HML1 206 is deposited with a sputtering process. The sputter target may include a matrix having FePt with a higher Pt content than that utilized for the formation of the LSML 204. At operation 406, a second exchange couple layer (ECL2) 207 is deposited over HML1 206 similar to the process in operation 404.

The combination of operations 403, 404, 405, and 406 are then repeated to form the middle soft magnetic layer (MSML) 208, the third exchange couple layer (ECL3) 209, the second hard magnetic layer (HML2) 210, and the fourth exchange couple layer (ECL4) 211, respectively. In other embodiments, this combination of operations may be repeated to form additional ECC layers. At operation 407, an upper soft magnetic layer (USML) 212 is deposited over ECL4 211.

The deposition of each of the SUL 203, soft magnetic layers (204, 208, 212), exchange couple layers (205, 207, 209, 211), and hard magnetic layers (206, 210) can be accomplished by a variety of methods well known in the art, for example, electroless plating, sputtering (e.g., static or in-line), chemical vapor deposition (CVD), ion-beam deposition (IBD), etc.

Figure 6:
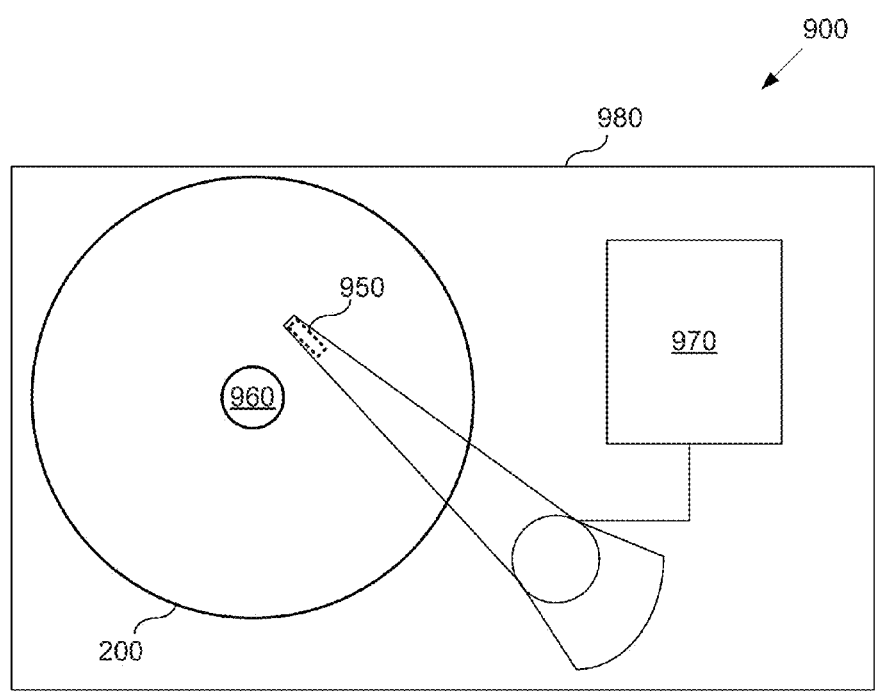
FIG. 6 illustrates a disk drive including a PMR disk with a multiple ECC structure in accordance with an embodiment of the present invention.

FIG. 6 illustrates a disk drive having a PMR disk 200. Disk drive 900 may include one or more PMR disks 200 to store data. PMR disk 200 resides on a spindle assembly 960 that is mounted to drive housing 980. Data may be stored along tracks in the magnetic recording layer of PMR disk 200. The reading and writing of data is accomplished with head 950 that has both read and write elements. The write element is used to alter the properties of the perpendicular magnetic recording layer of PMR disk 200. In one embodiment, head 950 may have magneto-resistive (MR), giant magneto-resistive (GMR), or tunneling GMR (TGMR) elements. In an alternative embodiment, head 950 may be another type of head, for example, an inductive read/write head or a Hall effect head. A spindle motor (not shown) rotates spindle assembly 960 and, thereby, PMR disk 200 to position head 950 at a particular location along a desired disk track. The position of head 950 relative to PMR disk 200 may be controlled by position control circuitry 970. The use of PMR disk 200 with a multiple ECC structure as discussed above may improve the performance of the recording layer 150 of PMR disk 200.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A perpendicular magnetic recording disk, comprising:
   a substrate;
   a first hard magnetic layer disposed above the substrate;
   a lower soft magnetic layer disposed between the substrate and the first hard magnetic layer, the first hard magnetic layer being disposed closer to the substrate than any other hard magnetic layer;
   a soft magnetic underlayer in contact with the lower soft magnetic layer and disposed between the substrate and the lower soft magnetic layer;
   a first exchange coupling layer disposed between the lower soft magnetic layer and the first hard magnetic layer;
   a middle soft magnetic layer disposed above the first hard magnetic layer;
   a second hard magnetic layer disposed above the middle soft magnetic layer;
   a second exchange coupling layer disposed between the first hard magnetic layer and the middle soft magnetic layer;
   a third exchange coupling layer disposed between the middle soft magnetic layer and the second hard magnetic layer;
   a fourth exchange coupling layer disposed above the second hard magnetic layer; and
   an upper soft magnetic layer disposed above the fourth exchange coupling layer.

2. The perpendicular magnetic recording disk of claim 1, wherein a second anisotropy field of the middle soft magnetic layer is greater than a first anisotropy field of the lower soft magnetic layer.

3. The perpendicular magnetic recording disk of claim 1, wherein a third anisotropy field of upper soft magnetic layer is greater than the second anisotropy field of the middle soft magnetic layer.

4. The perpendicular magnetic recording disk of claim 1, wherein a lateral exchange coupling in each of the soft magnetic layers is approximately 0.2 μerg/cm, and wherein a coupling across each of the exchange coupling layers is on the order of 1 erg/cm$^2$.

5. The perpendicular magnetic recording disk of claim 1, wherein the first and second hard magnetic layers are ferromagnetic layers.

6. The perpendicular magnetic recording disk of claim 1, wherein a lateral exchange coupling in each of the hard magnetic layers is 0.1 uerg/cm.

7. The perpendicular magnetic recording disk of claim 1, wherein an anisotropy field of each of the hard magnetic layers is greater than 10 kOe.

8. The perpendicular magnetic recording disk of claim 7, wherein an anisotropy field of each of the soft magnetic layers is less than 10 kOe.

9. The perpendicular magnetic recording disk of claim 8, further comprising a seed layer disposed between the soft magnetic underlayer and the substrate.

10. The perpendicular magnetic recording disk of claim 8, wherein the anisotropy field of each of the soft magnetic layers is between 4 kOe and less than 10 kOe.

11. The perpendicular magnetic recording disk of claim 10, wherein the anisotropy field of each of the soft magnetic layers is 8 kOe.

12. The perpendicular magnetic recording disk of claim 10, wherein an anisotropy field of each of the hard magnetic layers is between 12 kOe and 20 kOe.

13. The perpendicular magnetic recording disk of claim 12, wherein an anisotropy field of each of the hard magnetic layers is 18 kOe.

14. The perpendicular magnetic recording disk of claim 13, wherein each of the hard magnetic layers has a thickness between 6 nanometers (nm) and 12 nm.

15. The perpendicular magnetic recording disk of claim 14, wherein the thickness of each of the hard magnetic layers is 10 nm.

16. The perpendicular magnetic recording disk of claim 15, wherein a saturation magnetization for each of the hard magnetic layers and soft magnetic layers is between 500 emu/cc and 700 emu/cc.

17. The perpendicular magnetic recording disk of claim 16, wherein the saturation magnetization for each of the hard magnetic layers and soft magnetic layers is 600 emu/cc.

18. The perpendicular magnetic recording disk of claim 17, wherein each of the soft magnetic layers has a thickness between 3 nm and 6 nm.

* * * * *